(12) United States Patent
Takada et al.

(10) Patent No.: US 11,048,114 B2
(45) Date of Patent: Jun. 29, 2021

(54) LIQUID CRYSTAL DISPLAY APPARATUS

(71) Applicant: NITTO DENKO CORPORATION, Ibaraki (JP)

(72) Inventors: Katsunori Takada, Ibaraki (JP); Eiko Suefusa, Ibaraki (JP); Yoshitsugu Kitamura, Ibaraki (JP); Keisuke Kimura, Ibaraki (JP); Seiji Umemoto, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 15/766,084

(22) PCT Filed: Apr. 10, 2017

(86) PCT No.: PCT/JP2017/014641
§ 371 (c)(1),
(2) Date: Apr. 5, 2018

(87) PCT Pub. No.: WO2017/183499
PCT Pub. Date: Oct. 26, 2017

(65) Prior Publication Data
US 2018/0292709 A1    Oct. 11, 2018

(30) Foreign Application Priority Data

Apr. 18, 2016 (JP) ............................. JP2016-083234
Feb. 22, 2017 (JP) ............................. JP2017-030729

(51) Int. Cl.
*G02F 1/1335* (2006.01)
*G02F 1/13363* (2006.01)
(Continued)

(52) U.S. Cl.
CPC .... *G02F 1/133528* (2013.01); *G02F 1/13363* (2013.01); *G02F 1/133308* (2013.01);
(Continued)

(58) Field of Classification Search
CPC ............. G02F 1/13528; G02F 1/13363; G02F 1/134309; G02F 2001/133638;
(Continued)

(56) References Cited

U.S. PATENT DOCUMENTS 6,081,312 A * 6/2000 Aminaka ............. G02B 5/3016
349/117
7,719,745 B2   5/2010 Yamada
(Continued)

FOREIGN PATENT DOCUMENTS

JP        H06-24812 Y      6/1994
JP        2007-279756 A    10/2007
(Continued)

OTHER PUBLICATIONS

International Search Report dated Jun. 27, 2017, issued in counterpart International Application No. PCT/JP2017/014641 (1 page).
(Continued)

*Primary Examiner* — Dung T Nguyen
(74) *Attorney, Agent, or Firm* — Westerman, Hattori, Daniels & Adrian, LLP

(57) ABSTRACT

There is provided a liquid crystal display apparatus having the following feature: although the liquid crystal display apparatus has a step between its display screen and outermost surface, the step is hardly recognized; and the liquid crystal display apparatus can achieve bright display. A liquid crystal display apparatus according to the present invention includes a liquid crystal cell; a first polarizer arranged on a back surface side of the liquid crystal cell; a cover sheet arranged on a viewer side of the liquid crystal cell, the cover sheet having a transmission portion at a position corresponding to a display region of the liquid crystal cell; and a second polarizer arranged on a viewer side of the cover sheet to cover the transmission portion, wherein an absorption axis
(Continued)

direction of the first polarizer and an absorption axis direction of the second polarizer are substantially perpendicular to each other.

7 Claims, 5 Drawing Sheets

(51) Int. Cl.
*G02F 1/1343* (2006.01)
*G02F 1/1333* (2006.01)
*G02B 5/30* (2006.01)

(52) U.S. Cl.
CPC .......... *G02F 1/134309* (2013.01); *G02B 5/30* (2013.01); *G02F 1/133331* (2021.01); *G02F 1/133541* (2021.01); *G02F 1/133562* (2021.01); *G02F 1/133637* (2021.01); *G02F 1/133638* (2021.01); *G02F 2201/38* (2013.01); *G02F 2202/28* (2013.01); *G02F 2413/06* (2013.01)

(58) Field of Classification Search
CPC ... G02F 2001/133541; G02F 1/133528; G02F 1/133308; G02F 1/133331
See application file for complete search history.

(56) References Cited

U.S. PATENT DOCUMENTS

| | | | |
|---|---|---|---|
| 7,847,877 B2 | 12/2010 | Nishikawa et al. | |
| 9,091,883 B2* | 7/2015 | Weindorf | G02F 1/133617 |
| 2006/0158579 A1* | 7/2006 | Hasegawa | G02F 1/133308 |
| | | | 349/58 |
| 2008/0218951 A1 | 9/2008 | Kusuda et al. | |
| 2009/0015901 A1 | 1/2009 | Yamada | |
| 2009/0033821 A1 | 2/2009 | Lee et al. | |
| 2009/0033824 A1* | 2/2009 | Nishikawa | G02F 1/133308 |
| | | | 349/58 |
| 2011/0285640 A1 | 11/2011 | Park et al. | |
| 2012/0105774 A1 | 5/2012 | Fletcher et al. | |
| 2012/0329970 A1 | 12/2012 | Kishioka et al. | |
| 2014/0022491 A1 | 1/2014 | Wiendort et al. | |
| 2015/0370108 A1* | 12/2015 | Wu | G02F 1/133528 |
| | | | 349/58 |
| 2016/0004122 A1 | 1/2016 | Ono | |
| 2017/0168356 A1 | 6/2017 | Yang et al. | |

FOREIGN PATENT DOCUMENTS

| | | |
|---|---|---|
| JP | 2009-20141 A | 1/2009 |
| JP | 2010-79087 A | 4/2010 |
| JP | 2011-127072 A | 6/2011 |
| JP | 2012-47895 A | 3/2012 |
| JP | 5877433 B2 | 3/2016 |
| KR | 10-2009-0005967 A | 1/2009 |
| WO | 2007/055189 A1 | 5/2007 |

OTHER PUBLICATIONS

Office Action dated Oct. 22, 2018, issued in U.S. Appl. No. 15/766,096 (14 pages).
International Search Report dated Jun. 27, 2017, issued in Counterpart of International Application No. PCT/JP2017/014640 (1 page).
International Search Report dated Jun. 27, 2017, issued in counterpart application No. PCT/JP2017/014642, w/English translation. (3 pages).
Office Action dated Oct. 18, 2018, issued in U.S. Appl. No. 15/766,081 (10 pages).
Office Action dated Oct. 18, 2018, issued in U.S. Appl. No. 15/766,096 (14 pages).
Notice of Allowance dated Mar. 27, 2019, issued in U.S. Appl. No. 15/766,096. (16 pages).
Notice of Allowance dated Mar. 27, 2019, issued in U.S. Appl. No. 15/766,081. (16 pages).
Supplementary European Search Report dated Aug. 30, 2019, issued in counterpart EP Application No. 17785839.6. (9 pages).
Office Action dated Sep. 15, 2020, issued in counterpart JP Application 2017-030729, with English translation (20 pages).
Office Action dated Dec. 1, 2020, issued in counterpart Japanese Application No. 2017-030729 (w/ English translation; 18 pages).
Office Action dated May 2, 2021, issued in counterpart Korean Application No. 10-2018-7013354 (w/ English machine translation; 11 pages).

* cited by examiner

LIQUID CRYSTAL DISPLAY APPARATUS

TECHNICAL FIELD

The present invention relates to a liquid crystal display apparatus.

BACKGROUND ART

A liquid crystal display apparatus has been used in a wide variety of applications including a television, a smart phone, a personal computer monitor, and a digital camera, and the applications have been further expanding. As a result, such forms that the liquid crystal display apparatus is embedded in various structures have been adopted in some applications of the liquid crystal display apparatus. Specific examples of such applications include: an operation information screen in a railway vehicle (e.g., the next-station guide display of a passenger vehicle); display portions, such as various meters and a navigation system arranged in the instrument panel and console of an automobile; various meters of the cockpit of an airplane; and a monitor arranged in a hospital, a security office, a combat information center, or the like. In each of such forms, in response to a demand in terms of the protection and/or design of the liquid crystal display apparatus, a cover sheet having a transmission portion corresponding to a display region of the liquid crystal display apparatus may be arranged on the viewer side of the liquid crystal display apparatus as required. In each of such forms, a step occurs between the outermost surface of a portion having embedded therein the liquid crystal display apparatus (e.g., the outermost surface of a casing, a wall, a monitor desk, or the cover sheet arranged as required) and the display screen of the apparatus, and the step may affect the viewability of the apparatus depending on an application and/or a situation. A technology involving arranging a neutral density filter on the viewer side has been proposed for making it difficult to recognize the step (Patent Literature 1). However, the technology involves a problem in that the display screen itself darkens, though it becomes difficult to recognize the step.

CITATION LIST

Patent Literature

[PTL 1] JP 5877433 B2

SUMMARY OF INVENTION

Technical Problem

The present invention has been made to solve the conventional problem, and an object of the present invention is to provide a liquid crystal display apparatus having the following feature: although the liquid crystal display apparatus has a step between its display screen and outermost surface, the step is hardly recognized; and the liquid crystal display apparatus can achieve bright display.

Solution to Problem

According to one aspect of the present invention, a liquid crystal display apparatus is provided. The liquid crystal display apparatus includes a liquid crystal cell; a first polarizer arranged on a back surface side of the liquid crystal cell; a cover sheet arranged on a viewer side of the liquid crystal cell, the cover sheet having a transmission portion at a position corresponding to a display region of the liquid crystal cell; and a second polarizer arranged on a viewer side of the cover sheet to cover the transmission portion, wherein an absorption axis direction of the first polarizer and an absorption axis direction of the second polarizer are substantially perpendicular to each other.

In one embodiment of the invention, the liquid crystal display apparatus further includes a first optical compensation layer having an Re(550) of from 100 nm to 180 nm between the cover sheet and the second polarizer; and a second optical compensation layer having an Re(550) of from 100 nm to 180 nm between the cover sheet and the liquid crystal cell.

In one embodiment of the invention, an angle formed by a slow axis direction of the first optical compensation layer and the absorption axis direction of the second polarizer is from 35° to 55° or from 125° to 145°; and the slow axis direction of the first optical compensation layer and a slow axis direction of the second optical compensation layer are substantially perpendicular to each other.

In one embodiment of the invention, the first optical compensation layer and the second optical compensation layer each satisfy a relationship of Re(450)<Re(550).

In one embodiment of the invention, the transmission portion of the cover sheet comprises an opening portion, and the opening portion is filled with a pressure-sensitive adhesive.

In one embodiment of the invention, the pressure-sensitive adhesive has a refractive index of from 1.30 to 1.70.

Advantageous Effects of Invention

According to the present invention, in a liquid crystal display apparatus having a step between its display screen and outermost surface, a polarizer on its viewer side is arranged on a side closer to a viewer with respect to the step. Accordingly, while the brightness of the display screen is maintained, the step is made difficult to recognize and hence the viewability of the apparatus can be improved. In one embodiment, so-called λ/4 plates are further arranged on both sides of the step, and hence the difficulty with which the step is recognized can be more significantly raised.

DESCRIPTION OF EMBODIMENTS

Now, embodiments of the present invention are described with reference to the drawings. However, the present invention is not limited to these embodiments.

Definitions of Terms and Symbols

The definitions of terms and symbols used herein are as follows.

(1) Refractive Indices (Nx, Ny, and Nz)

A symbol "nx" represents a refractive index in a direction in which an in-plane refractive index is maximum (that is, slow axis direction), "ny" represents a refractive index in a direction perpendicular to the slow axis in the plane (that is, fast axis direction), and "nz" represents a refractive index in a thickness direction.

(2) In-Plane Retardation (Re)

The term "Re($\lambda$)" refers to the in-plane retardation of a film measured at 23° C. with light having a wavelength of $\lambda$ nm. The Re($\lambda$) is determined from the equation "Re=(nx−ny)×d" when the thickness of the film is represented by d (nm). For example, the term "Re (550)" refers to the in-plane retardation of the film measured at 23° C. with light having a wavelength of 550 nm.

(3) Thickness Direction Retardation (Rth)

The term "Rth($\lambda$)" refers to the thickness direction retardation of the film measured at 23° C. with light having a wavelength of $\lambda$ nm. The Rth($\lambda$) is determined from the equation "Rth=(nx−nz)×d" when the thickness of the film is represented by d (nm). For example, the term "Rth(550)" refers to the thickness direction retardation of the film measured at 23° C. with light having a wavelength of 550 nm.

(4) Nz Coefficient

An Nz coefficient is determined from the equation "Nz=Rth/Re".

(5) Substantially Perpendicular or Parallel

The expressions "substantially perpendicular" and "approximately perpendicular" include a case where an angle formed by two directions is 90°±10°, preferably 90°±7°, more preferably 90°±5°. The expressions "substantially parallel" and "approximately parallel" include a case where an angle formed by two directions is 0°±10°, preferably 0°±7°, more preferably 0°±5°. Moreover, in this specification, such a simple expression "perpendicular" or "parallel" can include a substantially perpendicular state or a substantially parallel state.

A. Overall Configuration of Liquid Crystal Display Apparatus

Figure 1:
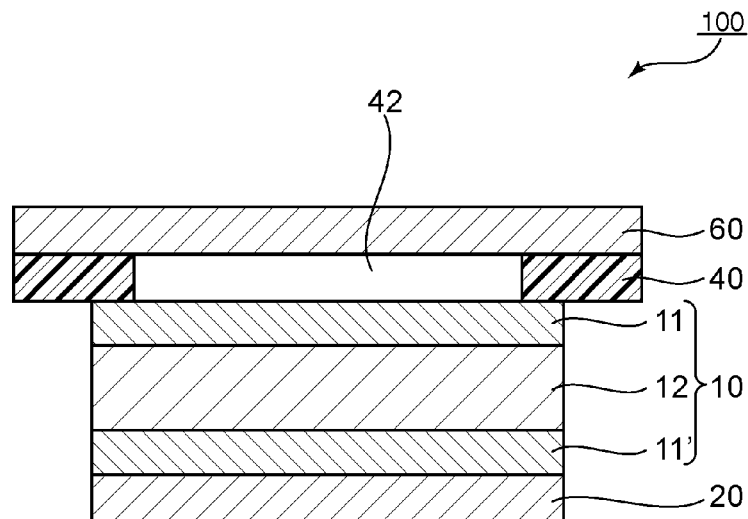
FIG. 1 is a schematic sectional view of a liquid crystal display apparatus according to one embodiment of the present invention.

FIG. 1 is a schematic sectional view of a liquid crystal display apparatus according to one embodiment of the present invention. A liquid crystal display apparatus 100 includes: a liquid crystal cell 10; a first polarizer 20 arranged on the back surface side of the liquid crystal cell 10; a cover sheet 40 arranged on the viewer side of the liquid crystal cell 10; and a second polarizer 60 arranged on the viewer side of the cover sheet 40. The cover sheet 40 has a transmission portion 42 at a position corresponding to the display region of the liquid crystal cell 10. The transmission portion includes a physical transmission portion (e.g., an opening portion) and an optical transmission portion (e.g., a transparent portion). In the illustrated example, an opening portion is illustrated. The second polarizer 60 is arranged to cover the transmission portion 42 of the cover sheet 40. According to the embodiment of the present invention, the second polarizer is arranged on the outermost surface side of the apparatus to cover the transmission portion of the cover sheet, and hence a step between the outermost surface of the apparatus and the display screen thereof is made difficult to recognize. As a result, the viewability of the liquid crystal display apparatus can be improved. In more detail, the step can be made difficult to recognize by virtue of a transmittance intrinsic to the polarizer, and the polarizer can efficiently transmit polarized light in a predetermined direction. Accordingly, the brightness of the display screen can be maintained as compared to a neutral density filter configured to entirely reduce light. Further, when the transmission portion of the cover sheet is an opening portion, the step can be made difficult to recognize by covering the opening portion to smoothen the outermost surface. The phrase "the step is made difficult to recognize" is hereinafter sometimes referred to as "a visual step is reduced."

In the liquid crystal display apparatus according to the embodiment of the present invention, the absorption axis direction of the first polarizer 20 and the absorption axis direction of the second polarizer 60 are substantially perpendicular or parallel to each other, and in typical cases, the directions are substantially perpendicular to each other.

The liquid crystal display apparatus according to the embodiment of the present invention may be in a so-called O mode or a so-called E mode. The term "liquid crystal display apparatus in the O mode" refers to a liquid crystal display apparatus in which the absorption axis direction of the polarizer arranged on the light source side of the liquid crystal cell is substantially parallel to the initial alignment direction of the liquid crystal cell. The term "liquid crystal display apparatus in the E mode" refers to a liquid crystal display apparatus in which the absorption axis direction of the polarizer arranged on the light source side of the liquid crystal cell is substantially perpendicular to the initial alignment direction of the liquid crystal cell. The term "initial alignment direction of the liquid crystal cell" refers to a direction in which in absence of the electric field, the in-plane refractive index of the liquid crystal layer obtained as a result of alignment of liquid crystal molecules contained in the liquid crystal layer becomes maximum (i.e., a slow axis direction).

Figure 2:
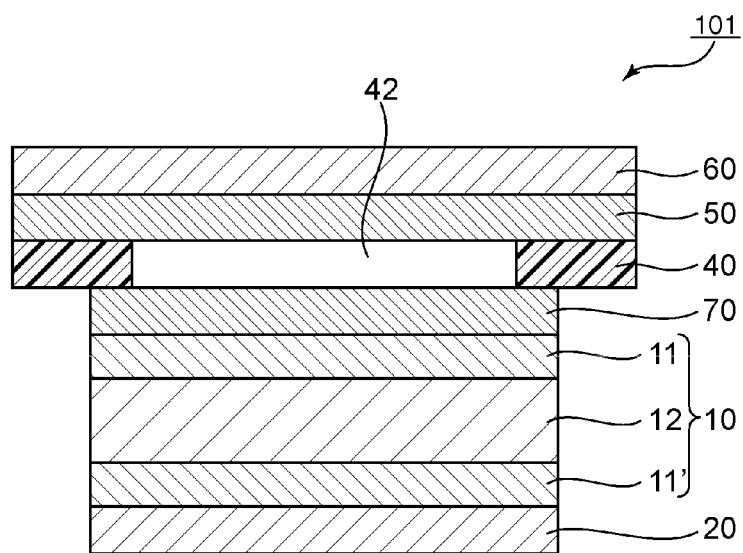
FIG. 2 is a schematic sectional view of a liquid crystal display apparatus according to another embodiment of the present invention.

FIG. 2 is a schematic sectional view of a liquid crystal display apparatus according to another embodiment of the present invention. A liquid crystal display apparatus 101 further includes a first optical compensation layer 50 between the cover sheet 40 and the second polarizer 60, and further includes a second optical compensation layer 70 between the cover sheet 40 and the liquid crystal cell 10. The Re(550) of each of the first optical compensation layer 50 and the second optical compensation layer 70 is typically from 100 nm to 180 nm, preferably from 110 nm to 170 nm, more preferably from 120 nm to 160 nm. An angle formed by the slow axis direction of the first optical compensation layer 50 and the absorption axis direction of the second polarizer 60 is typically from 35° to 55°, preferably from 38° to 52°, more preferably from 42° to 48°, still more preferably about 45°. Alternatively, the angle is typically from 125° to 145°, preferably from 128° to 142°, more preferably from 132° to 138°, still more preferably about 135°. When the angle falls within such range, the combination of the first optical compensation layer and the second polarizer can achieve an excellent circular polarization function and an excellent antireflection function. As a result, the visual step of the apparatus can be significantly reduced while practically acceptable brightness of the display screen thereof is maintained. That is, unlike, for example, the case where the visual step is reduced by reducing the transmittance with a neutral density filter, the visual step can be reduced without any reduction in transmittance thereof. When the first optical compensation layer is arranged, the first optical compensation layer and the second polarizer may each be introduced as a separate member into the liquid crystal display apparatus, or may be introduced as a laminate of the first optical compensation layer and the second polarizer (i.e., a circularly polarizing plate) into the liquid crystal display apparatus. It is preferred that the slow axis direction of the first optical compensation layer 50 and the slow axis direction of the second optical compensation layer 70 be substantially perpendicular to each other. For example, when the absorption axis direction of the second polarizer 60 is 0°, the absorption axis direction of the first polarizer 20 is 90°, and the slow axis direction of the first optical compensation layer 50 is 45°, the slow axis direction of the second optical compensation layer 70 may be set to −45°. Combined arrangement of the first optical compensation layer and the second optical compensation layer enables the liquid crystal display apparatus to display a black color.

In the embodiment of FIG. 2, the first optical compensation layer and the second optical compensation layer may be identical to or different from each other in constituent material, optical characteristic, thickness, and the like. In one embodiment, the first optical compensation layer and the second optical compensation layer each satisfy a relationship of Re(450)<Re(550). When the optical compensation layers each satisfy such relationship, an excellent antireflection function is achieved, and as a result, the visual step can be reduced.

Figure 3:
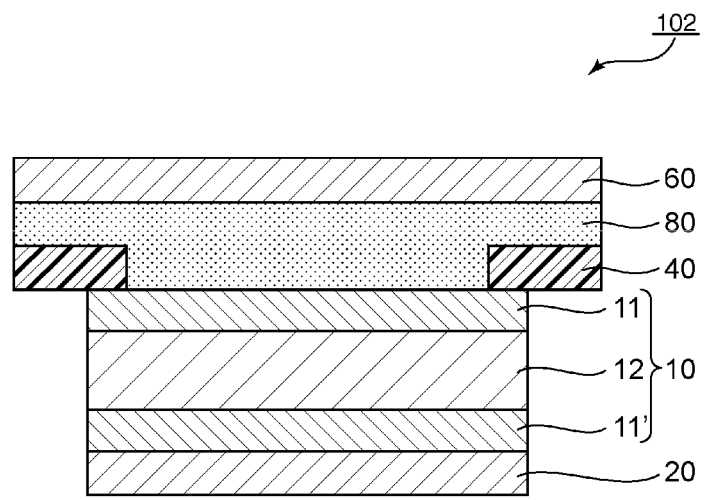
FIG. 3 is a schematic sectional view of a liquid crystal display apparatus according to still another embodiment of the present invention.

FIG. 3 is a schematic sectional view of a liquid crystal display apparatus according to still another embodiment of the present invention. In a liquid crystal display apparatus 102, a pressure-sensitive adhesive fills the opening portion of the cover sheet 40. The pressure-sensitive adhesive may fill only the opening portion, or may be part of a pressure-sensitive adhesive layer 80 arranged between the cover sheet 40 and the second polarizer 60. With such configuration, an air layer formed by the opening portion is eliminated, and hence reflection and/or refraction at a layer interface can be suppressed. As a result, the brightness of the display screen of the apparatus can be further improved, and hence the visual step thereof can be more significantly reduced. When the cover sheet has an optical transmission portion (transparent portion), the transparent portion may include the pressure-sensitive adhesive. The refractive index of the pressure-sensitive adhesive is preferably from 1.30 to 1.70, more preferably from 1.40 to 1.60, still more preferably from 1.45 to 1.55. When the refractive index of the pressure-sensitive adhesive is set within such range, the reflection and/or the refraction at the layer interface can be further suppressed, and hence balance between the brightness of the display screen and the visual step can be more excellent.

Figure 5:
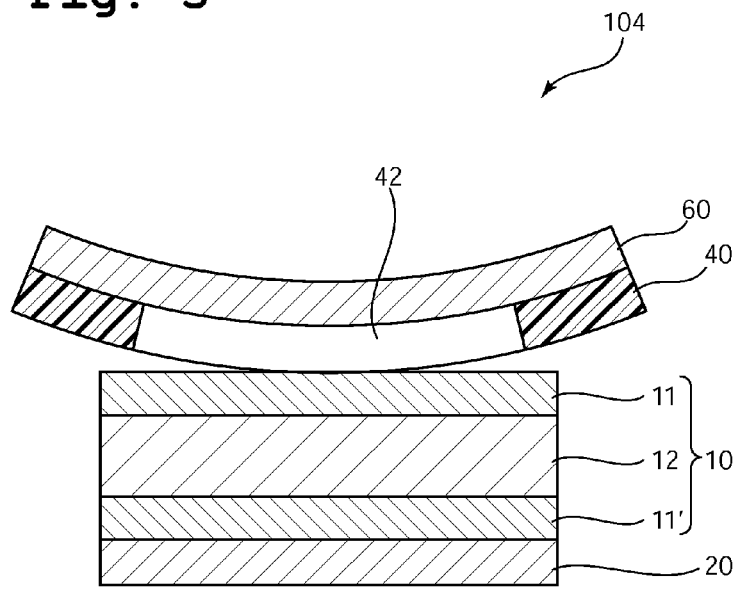
FIG. 5 is a schematic sectional view of a liquid crystal display apparatus according to still another embodiment of the present invention.
Figure 6:
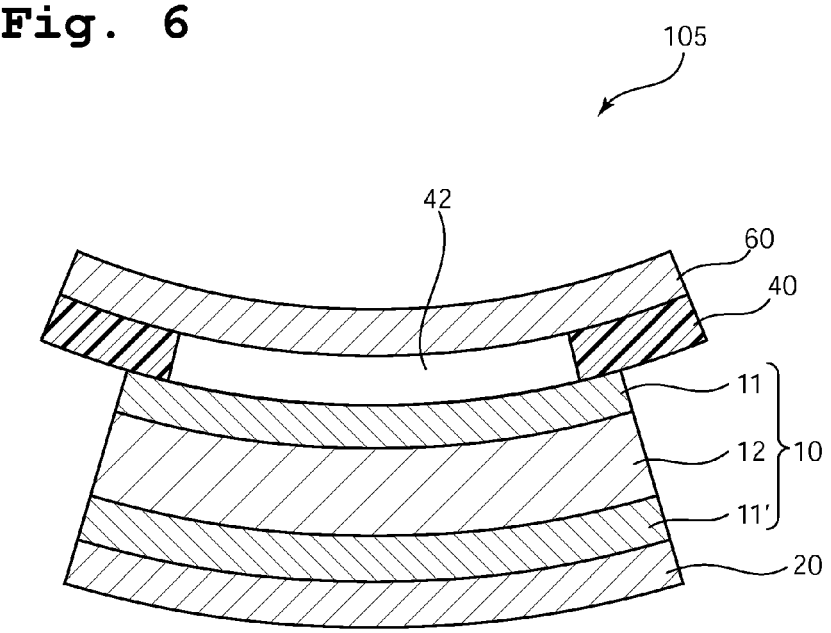
FIG. 6 is a schematic sectional view of a liquid crystal display apparatus according to still another embodiment of the present invention.

FIG. 5 is a schematic sectional view of a liquid crystal display apparatus according to still another embodiment of the present invention. In a liquid crystal display apparatus 104, the cover sheet 40 is curved, and the second polarizer 60 is curved along the cover sheet 40. The cover sheet 40 may be curved in any appropriate form. Specifically, the cover sheet may be curved so that its viewer side may be convex, or may be curved so that its viewer side may be concave. In addition, the cover sheet 40 may be curved about any direction in its surface. Further, the liquid crystal cell 10 and the first polarizer 20 may be curved along the cover sheet 40 like a liquid crystal display apparatus 105 illustrated in FIG. 6. The liquid crystal display apparatus 104 and 105 of this embodiment in each of which the cover sheet is curved have wide selection ranges of design and hence have high commercial values.

Figure 7:
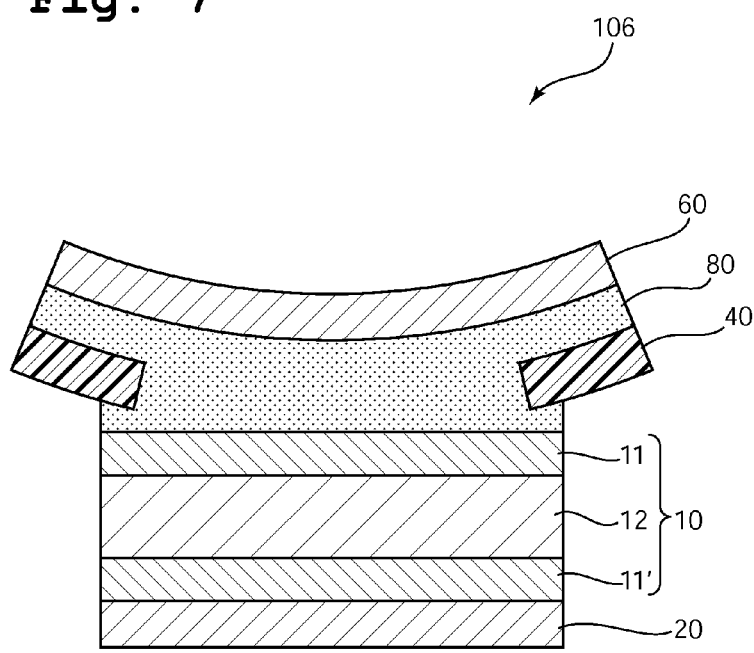
FIG. 7 is a schematic sectional view of a liquid crystal display apparatus according to still another embodiment of the present invention.

FIG. 7 is a schematic sectional view of a liquid crystal display apparatus according to still another embodiment of the present invention. In a liquid crystal display apparatus 106, a pressure-sensitive adhesive fills the opening portion of the cover sheet 40. The pressure-sensitive adhesive may fill only the opening portion, or may be part of a pressure-sensitive adhesive layer 80 arranged between the cover sheet 40 and the second polarizer 60. Further, in the liquid crystal display apparatus 106, the cover sheet 40 is curved, and the pressure-sensitive adhesive fills a gap between the cover sheet 40 and the liquid crystal cell 10 produced by the curving of the cover sheet 40. With such configuration, a reduction in mechanical strength of the apparatus due to the curving of the cover sheet 40 can be suppressed.

Figure 8:
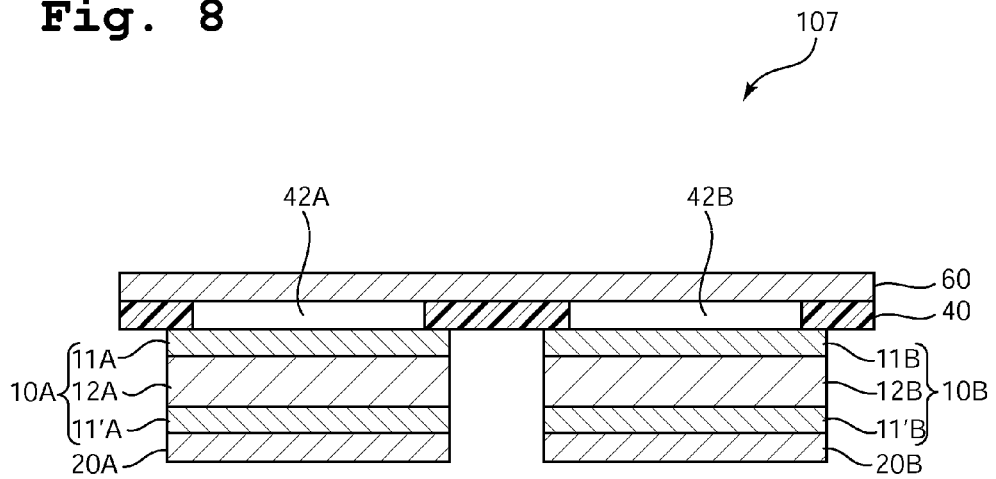
FIG. 8 is a schematic sectional view of a liquid crystal display apparatus according to still another embodiment of the present invention.

FIG. 8 is a schematic sectional view of a liquid crystal display apparatus according to still another embodiment of the present invention. A liquid crystal display apparatus 107 includes: a liquid crystal cell 10A; a first polarizer 20A arranged on the back surface side of the liquid crystal cell 10A; a liquid crystal cell 10B; a first polarizer 20B arranged on the back surface side of the liquid crystal cell 10B; the cover sheet 40 arranged on the viewer sides of the liquid crystal cell 10A and the liquid crystal cell 10B; and the second polarizer 60 arranged on the viewer side of the cover sheet 40. The cover sheet 40 of the liquid crystal display apparatus 107 includes a first transmission portion 42A at a position corresponding to the display region of the liquid crystal cell 10A, and includes a second transmission portion 42B at a position corresponding to the display region of the liquid crystal cell 10B. The liquid crystal display apparatus 107 has two display screens corresponding to the respective liquid crystal cells, and the second polarizer is arranged on its outermost surface side to cover the two transmission portions of the cover sheet. Accordingly, a step between the outermost surface of the apparatus and each of the two display screens is made difficult to recognize, and hence viewability in each of the two display screens can be improved. Although description has been given by taking a liquid crystal display apparatus having two display screens and two liquid crystal cells corresponding thereto as an example, the liquid crystal display apparatus of the present invention may have three or more display screens and their corresponding liquid crystal cells.

Figure 9:
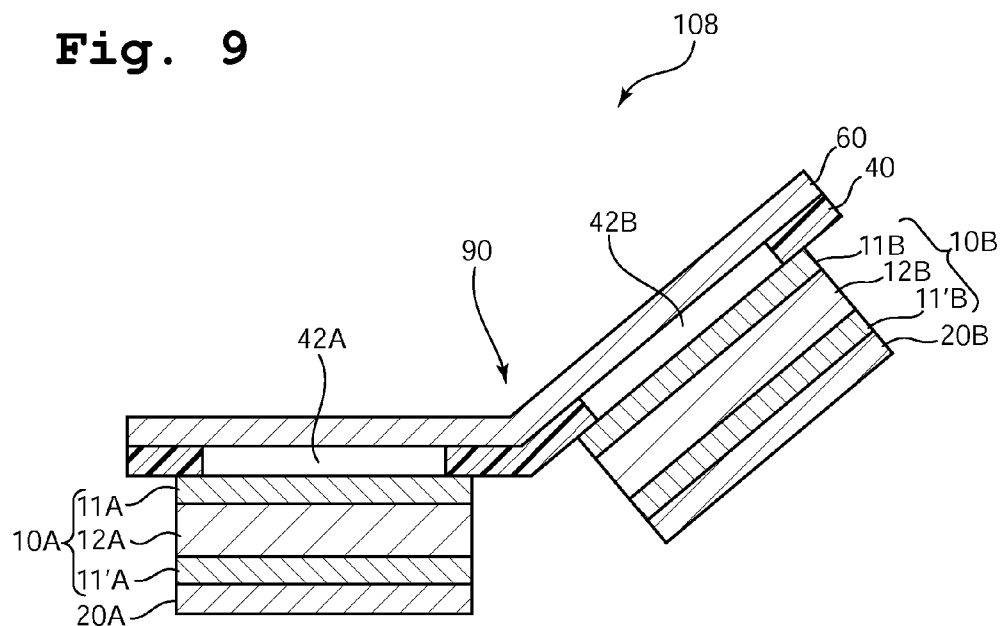
FIG. 9 is a schematic sectional view of a liquid crystal display apparatus according to still another embodiment of the present invention.

FIG. 9 is a schematic sectional view of a liquid crystal display apparatus according to still another embodiment of the present invention. A liquid crystal display apparatus 108 of this embodiment has two display screens as in the liquid crystal display apparatus 107. Further, in this embodiment, the cover sheet 40 is bent at a bending portion 90 between the transmission portion 42A and the transmission portion 42B, and the second polarizer 60 is bent along the cover sheet 40. Thus, the liquid crystal display apparatus 108 can display images toward different directions with the two display screens. The liquid crystal display apparatus of the present invention may be as follows: the cover sheet has a plurality of bending portions, and the apparatus has three or more display screens and their corresponding liquid crystal cells across the respective bending portions.

The liquid crystal display apparatus according to any one of the embodiments of the present invention may be used by, for example, being incorporated into (typically, embedded in) various structures. Specific examples of the structures include: a building structure (e.g., the wall of a security office or a combat information center); a railway vehicle (e.g., the wall of the upper portion of a door); an automobile (e.g., an instrument panel or a console); an airplane (e.g., a cockpit); a household electric appliance; and AV equipment.

The liquid crystal display apparatus according to any one of the embodiments of the present invention practically further includes a backlight unit (not shown). The backlight unit typically includes a light source and a light guide plate. The backlight unit may further include any appropriate other member (e.g., a diffusion sheet or a prism sheet).

The liquid crystal display apparatus according to any one of the embodiments of the present invention may further include any appropriate other member. For example, another optical compensation layer (retardation film) may be further arranged. The optical characteristics, number, combination, arrangement positions, and the like of the other optical compensation layers may be appropriately selected in accordance with, for example, purposes and desired optical characteristics. In addition, for example, various surface treatment layers may be arranged on the outer most surface of the apparatus. Specific examples of the surface treatment layers include an antiglare layer, an antireflection layer, and a hard coat layer. A plurality of surface treatment layers may be arranged. The kinds, number, combination, and the like of the surface treatment layers may be appropriately selected in accordance with purposes.

Figure 4:
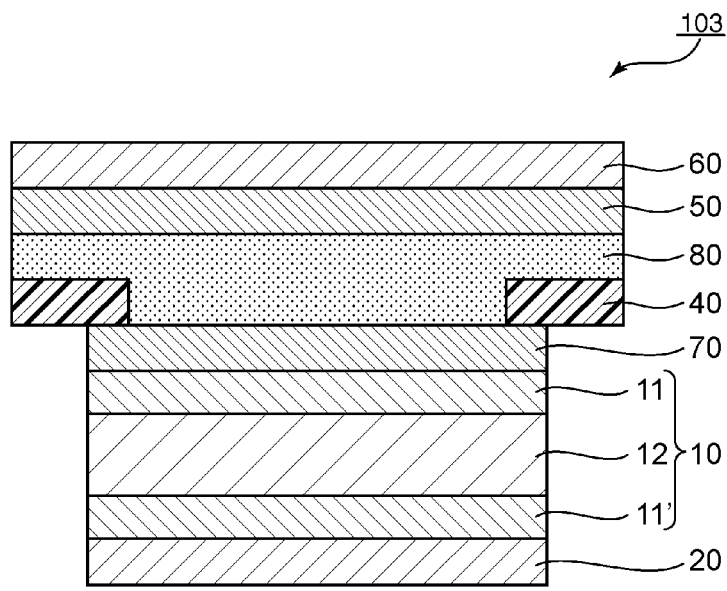
FIG. 4 is a schematic sectional view of a liquid crystal display apparatus according to still another embodiment of the present invention.
Figure 10:
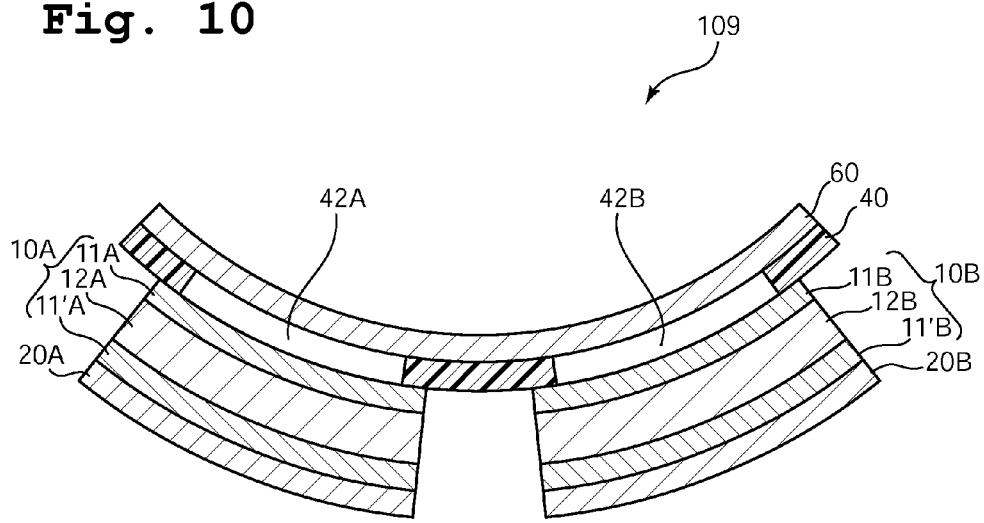
FIG. 10 is a schematic sectional view of a liquid crystal display apparatus according to still another embodiment of the present invention.

The above-mentioned embodiments may be appropriately combined, or configurations in the above-mentioned embodiments may be replaced with optically equivalent configurations. For example, the embodiment of FIG. 2 and the embodiment of FIG. 3 may be combined like FIG. 4. Specifically, a liquid crystal display apparatus 103 of FIG. 4 includes a combination of the first optical compensation layer 50, the second optical compensation layer 70, and a pressure-sensitive adhesive configured to fill the opening portion of the cover sheet. In addition, for example, the opening portion of the cover sheet of the illustrated example may be replaced with a transparent portion. In addition, for example, the embodiment of FIG. 6 and the embodiment of FIG. 8 may be combined like FIG. 10. Specifically, a liquid crystal display apparatus 109 of FIG. 10 includes the liquid crystal cell 10A and the liquid crystal cell 10B, each configuration is curved, and the cover sheet 40 includes the first transmission portion 42A at the position corresponding to the display region of the liquid crystal cell 10A, and includes the second transmission portion 42B at the position corresponding to the display region of the liquid crystal cell 10B.

The configuration of a liquid crystal display apparatus well-known and commonly used in the art may be adopted for matters that are not described herein.

Each member and each optical film forming the liquid crystal display apparatus are described below.

B. Liquid Crystal Cell

The liquid crystal cell 10 has a pair of substrates 11 and 11', and a liquid crystal layer 12 serving as a display medium interposed between the substrates. In a general configuration, a color filter and a black matrix are arranged on one substrate, and a switching element configured to control the electro-optical characteristics of liquid crystal, a scanning line configured to apply a gate signal to the switching element and a signal line configured to apply a source signal thereto, and a pixel electrode and a counter electrode are arranged on the other substrate. An interval (cell gap) between the substrates is controlled by a spacer or the like. For example, an alignment film formed of polyimide can be arranged on the side of each of the substrates in contact with the liquid crystal layer.

In one embodiment, the liquid crystal layer contains liquid crystal molecules aligned in homeotropic alignment under a state in which no electric field is present. The term "liquid crystal molecules aligned in homeotropic alignment" refers to liquid crystal molecules in the following state: as a result of an interaction between an alignment-treated substrate and each of the liquid crystal molecules, the alignment vector of each of the liquid crystal molecules is vertically aligned relative to the plane of the substrate. Such liquid crystal layer (as a result, the liquid crystal cell) typically shows a three-dimensional refractive index of nz>nx=ny. A typical example of a drive mode using the liquid crystal layer showing such three-dimensional refractive index is a vertical alignment (VA) mode. The VA mode includes a multi-domain VA (MVA) mode.

In another embodiment, the liquid crystal layer contains liquid crystal molecules aligned in homogeneous alignment under a state in which no electric field is present. The term "liquid crystal molecules aligned in homogeneous alignment" refers to liquid crystal molecules in the following state: as a result of an interaction between an alignment-treated substrate and each of the liquid crystal molecules, the alignment vector of each of the liquid crystal molecules is aligned in a parallel and uniform manner relative to the plane of the substrate. Such liquid crystal layer (as a result, the liquid crystal cell) typically shows a three-dimensional refractive index of nx>ny=nz. Typical examples of a drive mode using the liquid crystal layer showing such three-dimensional refractive index include an in-plane switching (IPS) mode and a fringe field switching (FFS) mode. The above-mentioned IPS mode includes a super in-plane switching (S-IPS) mode and an advanced super in-plane switching (AS-IPS) mode, each of which adopts a V-shaped electrode, a zigzag electrode, or the like. In addition, the above-mentioned FFS mode includes an advanced fringe field switching (A-FFS) mode and an ultra fringe field switching (U-FFS) mode, each of which adopts a V-shaped electrode, a zigzag electrode, or the like.

C. Polarizer

Any appropriate polarizer may be adopted as each of the first polarizer and the second polarizer (hereinafter sometimes collectively simply referred to as "polarizers"). For example, a resin film for forming the polarizer may be a single-layer resin film, or may be a laminate of two or more layers.

Specific examples of the polarizer including a single-layer resin film include: a polarizer obtained by subjecting a hydrophilic polymer film, such as a polyvinyl alcohol (PVA)-based film, a partially formalized PVA-based film, or an ethylene-vinyl acetate copolymer-based partially saponified film, to dyeing treatment with a dichromatic substance, such as iodine or a dichromatic dye, and stretching treatment; and a polyene-based alignment film, such as a dehydration-treated product of PVA or a dehydrochlorination-treated product of polyvinyl chloride. A polarizer obtained by dyeing the PVA-based film with iodine and uniaxially stretching the resultant is preferably used because the polarizer is excellent in optical characteristics.

The dyeing with iodine is performed by, for example, immersing the PVA-based film in an aqueous solution of iodine. The stretching ratio of the uniaxial stretching is preferably from 3 times to 7 times. The stretching may be performed after the dyeing treatment, or may be performed while the dyeing is performed. In addition, the dyeing may be performed after the stretching has been performed. The PVA-based film is subjected to swelling treatment, cross-linking treatment, washing treatment, drying treatment, or the like as required. For example, when the PVA-based film is immersed in water to be washed with water before the dyeing, contamination or an antiblocking agent on the surface of the PVA-based film can be washed off. In addition, the PVA-based film is swollen and hence dyeing unevenness or the like can be prevented.

The thickness of the polarizer is preferably from 1 μm to 80 μm, more preferably from 10 μm to 50 μm, still more preferably from 15 μm to 40 μm, particularly preferably from 20 μm to 30 μm. When the thickness of the polarizer falls within such range, durability under high temperature and high humidity can be excellent.

The polarizer preferably shows absorption dichroism at any wavelength in the wavelength range of from 380 nm to 780 nm. The single axis transmittance of the polarizer is preferably from 40.0% to 46.0%, more preferably from 41.0% to 44.0%. The polarization degree of the polarizer is preferably 97.0% or more, more preferably 99.0% or more, still more preferably 99.9% or more.

A protective layer (not shown) may be arranged on at least one surface of each of the first polarizer 20 and the second polarizer 60. That is, each of the first polarizer 20 and the second polarizer 60 may be incorporated as a polarizing plate into the liquid crystal display apparatus. As described above, the second polarizer 60 may be incorporated as a circularly polarizing plate into the liquid crystal display apparatus.

The protective layer is formed of any appropriate film that may be used as a protective layer for a polarizer. A material serving as a main component of the film is specifically, for example: a cellulose-based resin, such as triacetylcellulose (TAC); a transparent resin, such as a polyester-based, polyvinyl alcohol-based, polycarbonate-based, polyamide-based, polyimide-based, polyethersulfone-based, polysulfone-based, polystyrene-based, polynorbornene-based, polyolefin-based, (meth)acrylic, or acetate-based transparent resin; or a thermosetting resin or a WUV-curable resin, such as a (meth)acrylic, urethane-based, (meth)acrylic urethane-based, epoxy-based, or silicone-based thermosetting resin or WUV-curable resin. A further example there of is a glassy polymer, such as a siloxane-based polymer. In addition, a polymer film disclosed in JP2001-343529A (WO01/37007 A1) may be used. For example, a resin composition containing a thermoplastic resin having a substituted or unsubstituted imide group on a side chain thereof, and a thermoplastic resin having a substituted or unsubstituted phenyl group and a nitrile group on side chains thereof may be used as the material for the film, and the composition is, for example, a resin composition having an alternating copolymer formed of isobutene and N-methylmaleimide, and an acrylonitrile-styrene copolymer. The polymer film may be, for example, an extrudate of the resin composition.

The thickness of the protective layer is typically 5 mm or less, preferably 1 mm or less, more preferably from 1 μm to 500 μm, still more preferably from 5 μm to 150 μm. When the surface treatment is performed, the thickness of the protective layer is a thickness including the thickness of a surface treatment layer.

When the protective layer (hereinafter referred to as "inner protective layer") is arranged on the liquid crystal cell side of the first polarizer 20 and/or the second polarizer 60, the inner protective layer is preferably optically isotropic. The phrase "be optically isotropic" refers to having an in-plane retardation Re(550) of from 0 nm to 10 nm and a thickness direction retardation Rth (550) of from −10 nm to +10 nm. The inner protective layer may include any appropriate material as long as the inner protective layer is optically isotropic. The material may be appropriately selected from, for example, the materials described above for the protective layer.

The thickness of the inner protective layer is preferably from 5 μm to 200 μm, more preferably from 10 μm to 100 μm, still more preferably from 15 μm to 95 μm.

D. Cover Sheet

When the liquid crystal display apparatus is used by being incorporated into a structure, the cover sheet 40 may be typically arranged in response to a demand in terms of the protection and/or design of the liquid crystal display apparatus. Therefore, the cover sheet 40 typically has the transmission portion 42 corresponding to the display region of the liquid crystal cell in order that the display function of the liquid crystal display apparatus may not be inhibited. As described above, the transmission portion includes a physical transmission portion (e.g., an opening portion) and an optical transmission portion (e.g., a transparent portion).

The cover sheet may include any appropriate material. A typical example of the constituent material is a resin. This is because of the following reasons: the resin has a strength appropriate as the cover sheet; and the resin can be easily formed into a desired shape, and facilitates the formation of an opening portion. Specific examples of the resin include polyarylate, polyamide, polyimide, polyester, polyaryletherketone, polyamide-imide, polyesterimide, polyvinyl alcohol, polyfumarate, polyethersulfone, polysulfone, a norbornene resin, a polycarbonate resin, a cellulose resin, and polyurethane. Those resins may be used alone or in combination thereof.

In one embodiment, the cover sheet has a light-shielding property. The light-shielding property can be imparted by blending the resin with a light-shielding material (e.g., carbon black) at the time of forming into the cover sheet. In such an embodiment that the cover sheet has an opening portion, the entirety of the cover sheet except the opening portion typically has a light-shielding property. In such an embodiment that the cover sheet has a transparent portion, the entirety of the cover sheet except the transparent portion typically has a light-shielding property. In this case, the resin blended with the light-shielding material only needs to be used in a portion except the transparent portion.

The thickness of the cover sheet is preferably from 0.1 mm to 5 mm, more preferably from 0.3 mm to 3 mm. Such thickness can achieve a strength appropriate as a protective member for the liquid crystal display apparatus. According to the present invention, as described above, a physical step that may occur owing to such thickness of the cover sheet can be eliminated, and a visual step can be significantly reduced.

E. First Optical Compensation Layer

As described above, the first optical compensation layer 50 has an in-plane retardation Re(550) of from 100 nm to 180 nm, preferably from 110 nm to 170 nm, more preferably from 120 nm to 160 nm. When the in-plane retardation of the first optical compensation layer falls within such range, an excellent circular polarization function and an excellent antireflection function can be achieved by setting the slow axis direction of the first optical compensation layer so as to form an angle of from 35° to 55° (in particular, about 45°) or from 125° to 145° (in particular, about 135°) as described above with respect to the absorption axis direction of the second polarizer. As a result, the visual step of the apparatus can be significantly reduced while practically acceptable brightness of the display screen thereof is maintained.

The first optical compensation layer typically has a refractive index characteristic of showing a relationship of nx>ny≥nz or nx>nz>ny. The Nz coefficient of the first optical compensation layer is preferably from 0.3 to 2.0, more preferably from 0.5 to 1.5, still more preferably from 0.5 to 1.3. When such relationship is satisfied, a more excellent antireflection characteristic can be achieved.

The first optical compensation layer may show a reverse wavelength dispersion characteristic, i.e., a retardation value increasing with an increase in wavelength of measurement light, may show a positive wavelength dispersion characteristic, i.e., a retardation value decreasing with an increase in wavelength of measurement light, or may show a flat wavelength dispersion characteristic, i.e., a retardation value hardly changing even when the wavelength of measurement light changes. The first optical compensation layer preferably shows a reverse wavelength dispersion characteristic. When the first optical compensation layer shows such characteristic, an antireflection function can be achieved over a predetermined wavelength band only with a combination of the first optical compensation layer and the second polarizer without further use of a so-called λ/2 plate. In this case, the in-plane retardations of the first optical compensation layer satisfy a relationship of Re(450)<Re(550). A ratio "Re(450)/Re(550)" is preferably 0.8 or more and less than 1, more preferably 0.8 or more and 0.95 or less. Further, the in-plane retardations of the first optical compensation layer preferably satisfy a relationship of Re(550)<Re(650). A ratio "Re(550)/Re(650)" is preferably 0.8 or more and less than 1, more preferably 0.8 or more and 0.95 or less.

The first optical compensation layer is typically a retardation film formed of any appropriate resin that can achieve the above-mentioned characteristic. Examples of the resin for forming the retardation film include polyarylate, polyamide, polyimide, polyester, polyaryletherketone, polyamide-imide, polyesterimide, polyvinyl alcohol, polyfumarate, polyethersulfone, polysulfone, a norbornene resin, a polycarbonate resin, a cellulose resin, and polyurethane. Those resins may be used alone or in combination thereof. Of those, polyarylate, a norbornene resin, or a polycarbonate resin is preferred.

The polyarylate is preferably represented by the following formula (I).

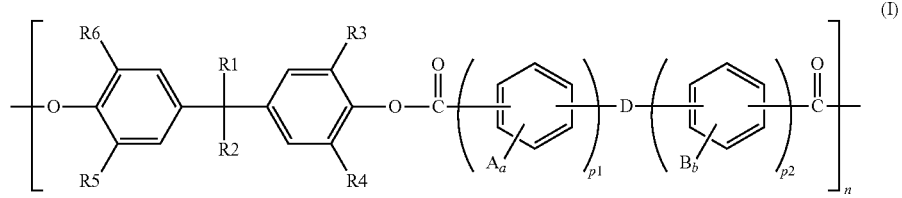

In the formula (I): A and B each represent a substituent, specifically a halogen atom, an alkyl group having 1 to 6 carbon atoms, or a substituted or unsubstituted aryl group, and A and B may be identical to or different from each other; a and b represent the numbers of substitutions with A and B, respectively, and each represent an integer of from 1 to 4; D represents a covalent bond, a $CH_2$ group, a $C(CH_3)_2$ group, a $C(CZ_3)_2$ group, where Z represents a halogen atom, a CO group, an O atom, a S atom, a $SO_2$ group, a $Si(CH_2CH_3)_2$ group, or a $N(CH_3)$ group; R1 represents a linear or branched alkyl group having 1 to 10 carbon atoms, or a substituted or unsubstituted aryl group; R2 represents a linear or branched alkyl group having 2 to 10 carbon atoms, or a substituted or unsubstituted aryl group; R3, R4, R5, and R6 each independently represent a hydrogen atom or a linear or branched alkyl group having 1 to 4 carbon atoms, and R3, R4, R5, and R6 may be identical to or different from each other; and p1 represents an integer of from 0 to 3, p2 represents an integer of from 1 to 3, and n represents an integer of 2 or more.

The norbornene-based resin is a resin polymerized by using a norbornene-based monomer as a polymerization unit. Examples of the norbornene-based monomer include: norbornene, alkyl- and/or alkylidene-substituted products thereof, such as 5-methyl-2-norbornene, 5-dimethyl-2-norbornene, 5-ethyl-2-norbornene, 5-butyl-2-norbornene, and 5-ethylidene-2-norbornene, and polar group- (such as halogen-) substituted products thereof; dicyclopentadiene and 2,3-dihydrodicyclopentadiene; dimethanooctahydronaphthalene, alkyl- and/or alkylidene-substituted products thereof, and polar group- (such as halogen-) substituted products thereof, such as 6-methyl-1,4:5,8-dimethano-1,4, 4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a, 5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; a trimer and a tetramer of cyclopentadiene, such as 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene. The norbornene-based resin may be a copolymer of the norbornene-based monomer and any other monomer.

As the polycarbonate resin, any appropriate polycarbonate resin may be used as long as the effect of the present invention is obtained. The polycarbonate resin preferably contains: a structural unit derived from a fluorene-based dihydroxy compound; a structural unit derived from an isosorbide-based dihydroxy compound; and a structural unit derived from at least one dihydroxy compound selected from the group consisting of an alicyclic diol, an alicyclic dimethanol, di-, tri-, or polyethylene glycol, and an alkylene glycol or spiroglycol. The polycarbonate resin more preferably contains: a structural unit derived from a fluorene-based dihydroxy compound; a structural unit derived from an isosorbide-based dihydroxy compound; and a structural unit derived from an alicyclic dimethanol and/or a structural unit derived from di-, tri-, or polyethylene glycol. The polycarbonate resin still more preferably contains: a structural unit derived from a fluorene-based dihydroxy compound; a structural unit derived from an isosorbide-based dihydroxy compound; and a structural unit derived from di-, tri-, or polyethylene glycol. The polycarbonate resin may contain a structural unit derived from any other dihydroxy compound as required. Details of the polycarbonate resin that may be suitably used in the present invention are disclosed in, for example, JP 2014-10291 A and JP 2014-26266 A. The disclosures of the laid-open publications are incorporated herein by reference.

The glass transition temperature of the polycarbonate resin is preferably 110° C. or more and 180° C. or less, more preferably 120° C. or more and 165° C. or less. When the glass transition temperature is excessively low, the heat resistance of the resin tends to deteriorate and hence the resin may cause a dimensional change after its forming into a film. In addition, the image quality of a liquid crystal display apparatus to be obtained may deteriorate. When the glass transition temperature is excessively high, the forming stability of the resin at the time of its forming into a film may deteriorate. In addition, the transparency of the film may be impaired. The glass transition temperature is determined in conformity to JIS K 7121 (1987).

The molecular weight of the polycarbonate resin may be expressed as a reduced viscosity. The reduced viscosity is measured with an Ubbelohde viscometer at a temperature of 20.0° C.±0.1° C. after precise adjustment of a polycarbonate concentration to 0.6 g/dL through the use of methylene chloride as a solvent. The lower limit of the reduced viscosity is generally preferably 0.30 dL/g, more preferably 0.35 dL/g or more. The upper limit of the reduced viscosity is generally preferably 1.20 dL/g, more preferably 1.00 dL/g, still more preferably 0.80 dL/g. When the reduced viscosity is lower than the lower limit value, there may arise a problem of a reduction in mechanical strength of a formed article. Meanwhile, when the reduced viscosity is higher than the upper limit value, there may arise a problem in that flowability during forming is decreased to decrease productivity and formability.

The retardation film is typically produced by stretching a resin film in at least one direction.

Any appropriate method may be adopted as a method of forming the resin film. Examples thereof include a melt extrusion method (e.g., a T die molding method), a cast coating method (e.g., a casting method), a calendar molding method, a hot press method, a co-extrusion method, a co-melting method, multilayer extrusion, and an inflation molding method. Of those, a T die molding method, a casting method, and an inflation molding method are preferably used.

The thickness of the resin film (unstretched film) may be set to any appropriate value depending on, for example, the desired optical characteristics, and stretching conditions to be described later. The thickness is preferably from 50 μm to 300 μm.

Any appropriate stretching method and stretching conditions (e.g., a stretching temperature, a stretching ratio, and a stretching direction) may be adopted for the stretching. Specifically, one kind of various stretching methods, such as free-end stretching, fixed-end stretching, free-end shrinkage, and fixed-end shrinkage, may be employed alone, or two or more kinds thereof may be employed simultaneously or sequentially. With regard to the stretching direction, the stretching may be performed in various directions or dimensions, such as a horizontal direction, a vertical direction, a thickness direction, and a diagonal direction. When the glass transition temperature of the resin film is represented by Tg, the stretching temperature falls within a range of preferably from Tg−30° C. to Tg+60° C., more preferably from Tg−10° C. to Tg+50° C.

A retardation film having the desired optical characteristics (e.g., a refractive index characteristic, an in-plane retardation, and an Nz coefficient) can be obtained by appropriately selecting the stretching method and stretching conditions.

In one embodiment, the retardation film is produced by continuously subjecting a resin film having an elongate shape to oblique stretching in the direction of the angle θ with respect to a lengthwise direction. When the oblique stretching is adopted, a stretched film having an elongate shape and having an alignment angle that is the angle θ with respect to the lengthwise direction of the film (having a slow axis in the direction of the angle θ) is obtained, and for example, roll-to-roll manufacture can be performed in its lamination with the polarizer, with the result that the manufacturing process can be simplified. The absorption axis of the polarizer is expressed in the lengthwise direction or widthwise direction of the elongate film due to its manufacturing method, and hence the angle θ may be the angle formed by the absorption axis of the second polarizer and the slow axis of the first optical compensation layer.

As a stretching machine to be used for the oblique stretching, for example, there is given a tenter stretching machine capable of applying feeding forces, or tensile forces or take-up forces, having different speeds on left and right sides in a lateral direction and/or a longitudinal direction. Examples of the tenter stretching machine include a lateral uniaxial stretching machine and a simultaneous biaxial stretching machine, and any appropriate stretching machine may be used as long as the resin film having an elongate shape can be continuously subjected to the oblique stretching.

The thickness of the retardation film (stretched film, i.e., first optical compensation layer) is preferably from 20 μm to 100 μm, more preferably from 20 μm to 80 μm, still more preferably from 20 μm to 65 μm. With such thickness, the above-mentioned desired in-plane retardation and Nz coefficient can be obtained.

F. Second Optical Compensation Layer

The optical characteristics, constituent material, thickness, and the like of the second optical compensation layer are as described in the section E for the first optical compensation layer. The second optical compensation layer may be identical to or different from the first optical compensation layer.

G. Optically Equivalent Modifications of First Optical Compensation Layer and Second Optical Compensation Layer The first optical compensation layer may be a laminate of the first optical compensation layer and a so-called λ/2 plate. Similarly, the second optical compensation layer may be a laminate of the second optical compensation layer and the λ/2 plate. Such configuration can achieve an excellent circular polarization function and an excellent antireflection function over a wide wavelength band.

The refractive index characteristic of the λ/2 plate preferably shows a relationship of nx>ny≥nz. The in-plane retardation Re(550) of the λ/2 plate is preferably from 190 nm to 360 nm, more preferably from 220 nm to 330 nm.

A relationship between the slow axis of the λ/2 plate and the slow axis of the first optical compensation layer or the slow axis of the second optical compensation layer is preferably adjusted so that an angle formed by the direction of polarized light after its passage through the λ/2 plate and the slow axis of the first optical compensation layer or the second optical compensation layer may be appropriate. For example, when the slow axis of the λ/2 plate is positioned on a clockwise side (0° to +180°) relative to the absorption axis of the second polarizer, the axial angle of the slow axis of the first optical compensation layer is preferably from +40° to +50°, more preferably from +43° to +47°, still more preferably +45° relative to the direction of the polarized light after the passage through the λ/2 plate. In addition, for example, when the slow axis of the λ/2 plate is positioned on a counterclockwise side (−180° to 0°) relative to the absorption axis of the second polarizer, the axial angle of the slow axis of the first optical compensation layer is preferably from −40° to −50°, more preferably from −43° to −47°, still more preferably −45° relative to the direction of the polarized light after the passage through the λ/2 plate. Similar relationships are applicable to the second optical compensation layer and the first polarizer. Here, the expression "+x°" means that an axial angle is x°clockwise relative to a reference direction, and the expression "−x°" means that the axial angle is x° counterclockwise relative to the reference direction.

The λ/2 plate is typically a stretched film of a resin film as in the first optical compensation layer and the second optical compensation layer.

H. Pressure-Sensitive Adhesive

In one embodiment, as described above, the transmission portion of the cover sheet 40 is an opening portion, and the opening portion is filled with the pressure-sensitive adhesive. As a result, an air layer formed by the opening portion is eliminated, and hence reflection and/or refraction at a layer interface can be suppressed. As a result, the visual step of the apparatus can be more significantly reduced while the brightness of the display screen thereof is maintained.

As described above, the refractive index of the pressure-sensitive adhesive is preferably from 1.30 to 1.70, more preferably from 1.40 to 1.60, still more preferably from 1.45 to 1.55. When the refractive index of the pressure-sensitive adhesive is set within such range, the reflection and/or the refraction at the layer interface can be further suppressed, and hence balance between the brightness of the display screen and the visual step can be more excellent.

A difference between the refractive index of the pressure-sensitive adhesive and the refractive index of a layer adjacent to the pressure-sensitive adhesive is preferably 0.20 or less, more preferably from 0 to 0.15. When the difference between the refractive index of the pressure-sensitive adhesive and the refractive index of the adjacent layer is set within such range, the above-mentioned effect in the case where the refractive index of the pressure-sensitive adhesive is set within a predetermined range may be further accelerated.

As described above, the pressure-sensitive adhesive may fill only the opening portion, or may be part of the pressure-sensitive adhesive layer 80 arranged between the cover sheet 40 and the second polarizer 60 (or the first optical compensation layer 50 if present). In the latter case, the thickness of the pressure-sensitive adhesive layer (thickness except a portion corresponding to the opening portion of the cover sheet) may be appropriately set in accordance with purposes, an adhesive strength, and the like. The thickness of the pressure-sensitive adhesive layer is preferably from 1 μm to 500 μm, more preferably from 1 μm to 200 μm, still more preferably from 1 μm to 100 μm.

The pressure-sensitive adhesive layer may include any appropriate pressure-sensitive adhesive having such characteristics as described above. Specific examples thereof include pressure-sensitive adhesives containing, as base polymers, an acrylic polymer, a silicone-based polymer, polyester, polyurethane, polyamide, polyether, a fluorine-based polymer, and a rubber-based polymer. Of those, a pressure-sensitive adhesive containing, as a base polymer, an acrylic polymer (acrylic pressure-sensitive adhesive) is preferred. The reason is that excellent optical transparency, moderate pressure-sensitive adhesive characteristics (wettability, cohesive property, and adhesive property), and excellent weatherability and heat resistance can be obtained.

EXAMPLES

Now, the present invention is specifically described by way of Examples. However, the present invention is not limited by these Examples. Measurement methods for characteristics are as described below.

(1) Physical Step

The presence or absence of the unevenness of the viewer side surface of a liquid crystal display apparatus obtained in each of Examples and Comparative Examples was confirmed.

(2) Visual Step

Under a state in which the liquid crystal display apparatus obtained in each of Examples and Comparative Examples was caused to actually display an image, a step was visually observed. An evaluation was performed by the following criteria.

A: Substantially no step is recognized and hence no problem occurs in the viewing of the image.

B: A step is recognized but substantially no influence on the viewing of the image occurs.

C: Such a step that a feeling of incongruity occurs in the viewing of the image is recognized.

D: A step is recognized so clearly that the viewing of the image is largely affected.

(3) Brightness of Display Screen

A brightness when a white color was displayed on the entire screen of the liquid crystal display apparatus obtained in each of Examples and Comparative Examples was measured. An evaluation was performed through the use of a brightness ratio when the brightness of Comparative Example 1 was defined as 100% by the following criteria.

A: Brightness ratio of more than 90%
B: Brightness ratio of from 80% to 90%
C: Brightness ratio of from 70% to 80%
D: Brightness ratio of less than 70%

Example 1

(i) Polarizing Plate Two commercial polarizing plates (manufactured by Nitto Denko Corporation, product name: "CWQ1463VCUHC") were prepared, and were defined as a first polarizing plate (polarizer) and a second polarizing plate (polarizer).

(ii) Cover Sheet

A commercial methacrylic resin sheet (manufactured by Nitto Jushi Kogyo Co., Ltd., product name: "FLAT N-885", thickness: 1.0 mm) was used, and its portion corresponding to a display region of a liquid crystal cell to be described later was punched to provide an opening portion.

(iii) Liquid Crystal Cell

A liquid crystal panel was removed from a product available under the product name "plusone" (IPSmode) from Century Corporation. Further, optical films bonded to the top and bottom of the liquid crystal cell were removed, and the surfaces from which the optical films had been removed were washed. A liquid crystal cell thus obtained was used.

(iv) Production of Liquid Crystal Display Apparatus

The cover sheet described in the (ii) and the polarizing plate (second polarizer) described in the (i) were bonded to one surface of the liquid crystal cell in the stated order from a liquid crystal cell side. The cover sheet was bonded so that its opening portion corresponded to the display region of the liquid crystal cell. The polarizing plate (second polarizer) and the cover sheet were bonded to each other with a typical acrylic pressure-sensitive adhesive, and the opening portion was not filled with the pressure-sensitive adhesive. Further, the polarizing plate (first polarizer) described in the (i) was bonded to the other surface of the liquid crystal cell. Here, the respective optical films were bonded so that the absorption axis of the first polarizer and the absorption axis of the second polarizer were perpendicular to each other. Further, a backlight unit removed from the "plus one" described in the (iii) was incorporated into the outside of the first polarizer. Thus, a liquid crystal display apparatus was produced. The resultant liquid crystal display apparatus was subjected to the evaluations (1) to (3). The results are shown in Table 1.

Example 2

A liquid crystal display apparatus was produced in the same manner as in Example 1 except that: a first optical compensation layer was further arranged between the second polarizer and the cover sheet; and a second optical compensation layer was further arranged between the cover sheet and the liquid crystal cell. Specifically, the first optical compensation layer and the second optical compensation layer were prepared by using two retardation films produced as described below. Here, the bonding of the respective optical films was performed so that: an angle formed by the slow axis of the first optical compensation layer and the absorption axis of the second polarizer was 450; and the slow axis of the first optical compensation layer and the slow axis of the second optical compensation layer were substantially perpendicular to each other. The resultant liquid crystal display apparatus was subjected to the same evaluations as those of Example 1. The results are shown in Table 1.

(Production of First Optical Compensation Layer and Second Optical Compensation Layer)

Retardation films were obtained by a method in conformity with Example 1 of JP 2014-26266 A. Each of the resultant retardation films had an Re(550) of 147 nm, an Nz coefficient of 1.0, a ratio "Re(450)/Re(550)" of 0.89, and a thickness of 40 μm.

Example 3

A liquid crystal display apparatus was produced in the same manner as in Example 1 except that the opening portion of the cover sheet was filled with the pressure-sensitive adhesive. The resultant liquid crystal display apparatus was subjected to the same evaluations as those of Example 1. The results are shown in Table 1.

Example 4

A liquid crystal display apparatus was produced in the same manner as in Example 2 except that the opening portion of the cover sheet was filled with the pressure-sensitive adhesive. The resultant liquid crystal display apparatus was subjected to the same evaluations as those of Example 1. The results are shown in Table 1.

Comparative Example 1

A liquid crystal display apparatus was produced in the same manner as in Example 1 except that the second polarizer was arranged between the cover sheet and the liquid crystal cell, i.e., the cover sheet was used as the outermost layer. The resultant liquid crystal display apparatus was subjected to the same evaluations as those of Example 1. The results are shown in Table 1.

Comparative Example 2

A liquid crystal display apparatus was produced in the same manner as in Comparative Example 1 except that a commercial neutral density filter (manufactured by Fujifilm Corporation, product name: "NEUTRAL DENSITY FILTER ND-0.5", transmittance: 36%) was further arranged on the viewer side of the cover sheet. The resultant liquid crystal display apparatus was subjected to the same evaluations as those of Example 1. The results are shown in Table 1.

Comparative Example 3

A liquid crystal display apparatus was produced in the same manner as in Comparative Example 1 except that a third polarizer was further arranged on the viewer side of the cover sheet. The same polarizing plate as the first polarizer (polarizing plate) and the second polarizer (polarizing plate) was used as the third polarizer (polarizing plate). Further, the third polarizer was bonded so that its absorption axis was substantially parallel to the absorption axis of the second polarizer. The resultant liquid crystal display apparatus was subjected to the same evaluations as those of Example 1. The results are shown in Table 1.

TABLE 1

| | Configuration on viewer side | Physical step | Visual step | Brightness |
|---|---|---|---|---|
| Example 1 | Second polarizer/cover sheet | Absent | B | A (90) |
| Example 2 | Second polarizer/first optical compensation layer/cover sheet/second optical compensation layer | Absent | A | B (88) |
| Example 3 | Second polarizer/cover sheet (opening portion is filled) | Absent | B | A (98) |
| Example 4 | Second polarizer/first optical compensation layer/cover sheet (opening portion is filled)/second optical compensation layer | Absent | A | A (96) |
| Comparative Example 1 | Cover sheet/second polarizer | Present | D | A (100) |
| Comparative Example 2 | Neutral density filter/cover sheet/second polarizer | Absent | C | D (36) |
| Comparative Example 3 | Third polarizer/cover sheet/second polarizer | Absent | B | C (79) |

*A numerical value in parentheses in the column "Brightness" represents a brightness ratio (%) when the brightness of Comparative Example 1 is defined as 100%.

As is apparent from Table 1, in the liquid crystal display apparatus of each of Examples of the present invention, the physical step was eliminated, and balance between the visual step and the brightness of the display screen was excellent. In the liquid crystal display apparatus of Comparative Example 1 using the cover sheet as the outermost layer on its viewer side, the display screen was bright, but the physical step was not eliminated and the visual step was so remarkable as to affect the viewability of the apparatus. In the liquid crystal display apparatus of Comparative Example 2 using the neutral density filter, the physical step was eliminated, but both the brightness of the display screen and the degree of reduction of the visual step were poor, and in particular, the brightness of the display screen was extremely poor. In the liquid crystal display apparatus of Comparative Example 3 in which the second polarizer was arranged between the cover sheet and the liquid crystal cell, and the third polarizer was further arranged on the viewer side of the cover sheet, the brightness of the display screen was poor. Further, as is apparent from comparison between Example 1 and Example 3, and between Example 2 and Example 4, it is found that the brightness can be further improved by filling the opening portion with the pressure-sensitive adhesive.

INDUSTRIAL APPLICABILITY

The liquid crystal display apparatus of the present invention can be used for various applications, such as portable devices including a personal digital assistant (PDA), a cellular phone, a watch, a digital camera, and a portable gaming machine, OA devices including a personal computer monitor, a notebook-type personal computer, and a copying machine, household electric appliances including a video camera, a liquid crystal television set, a microwave oven, and AV equipment, on-board devices including a reverse monitor, a monitor for a car navigation system, and a car audio, exhibition devices including an information monitor for a commercial store, security devices including a surveillance monitor, and caring/medical devices including a caring monitor and a medical monitor. In particular, the liquid crystal display apparatus of the present invention can be suitably used in the form of being embedded in a structure.

REFERENCE SIGNS LIST 10 liquid crystal cell
20 first polarizer
40 cover sheet
50 first optical compensation layer
60 second polarizer
70 second optical compensation layer
80 pressure-sensitive adhesive layer
100 liquid crystal display apparatus

The invention claimed is:

1. A liquid crystal display apparatus, comprising:
a liquid crystal cell having a viewer side without a polarizer directly disposed on the viewer side;
a first polarizer arranged on a back surface side of the liquid crystal cell;
a cover sheet arranged on the viewer side of the liquid crystal cell, the cover sheet having a transmission portion at a position corresponding to a display region of the liquid crystal cell; and
a second polarizer arranged on a viewer side of the cover sheet to cover the transmission portion,
wherein an absorption axis direction of the first polarizer and an absorption axis direction of the second polarizer are substantially perpendicular to each other,
wherein the transmission portion does not have polarizing properties,
wherein the second polarizer is a polarizer which is nearest to the liquid crystal cell, on the viewer side of the liquid crystal cell, and
wherein the cover sheet is formed of a resin sheet having a thickness of 0.1 mm to 5 mm.

2. The liquid crystal display apparatus according to claim 1, further comprising:
a first optical compensation layer having an Re(550) of from 100 nm to 180 nm between the cover sheet and the second polarizer; and
a second optical compensation layer having an Re(550) of from 100 nm to 180 nm between the cover sheet and the liquid crystal cell.

3. The liquid crystal display apparatus according to claim 2, wherein:
an angle formed by a slow axis direction of the first optical compensation layer and the absorption axis direction of the second polarizer is from 35° to 55° or from 125° to 145°; and
the slow axis direction of the first optical compensation layer and a slow axis direction of the second optical compensation layer are substantially perpendicular to each other.

4. The liquid crystal display apparatus according to claim 2, wherein the first optical compensation layer and the second optical compensation layer each satisfy a relationship of Re(450)<Re(550).

5. The liquid crystal display apparatus according to claim 1, wherein the transmission portion of the cover sheet comprises an opening portion, and the opening portion is filled with a pressure-sensitive adhesive.

6. The liquid crystal display apparatus according to claim 5, wherein the pressure-sensitive adhesive has a refractive index of from 1.30 to 1.70.

7. A liquid crystal display apparatus, comprising:
a liquid crystal cell having a viewer side without a polarizer directly disposed on the viewer side;
a first polarizer arranged on a back surface side of the liquid crystal cell;
a cover sheet arranged on the viewer side of the liquid crystal cell, the cover sheet having an opening portion at a position corresponding to a display region of the liquid crystal cell;
a second polarizer arranged on a viewer side of the cover sheet and directly bonded to the cover sheet to cover the opening portion;
wherein an absorption axis direction of the first polarizer and an absorption axis direction of the second polarizer are substantially perpendicular to each other,
wherein the second polarizer is a polarizer which is nearest to the liquid crystal cell, on the viewer side of the liquid crystal cell, and
wherein the cover sheet is formed of a resin sheet having a thickness of 0.1 mm to 5 mm.

\* \* \* \* \*